June 21, 1932. R. KOLLER 1,863,797
SELF ACTING DISPLAY SYSTEM
Filed May 22, 1930 6 Sheets-Sheet 1

Inventor:
Robert Koller
By Watson E. Coleman

Inventor:
Robert Koller
By Watson E. Coleman.

June 21, 1932.  R. KOLLER  1,863,797

SELF ACTING DISPLAY SYSTEM

Filed May 22, 1930  6 Sheets-Sheet 5

Inventor:
Robert Koller
By Watson E. Coleman.

June 21, 1932.   R. KOLLER   1,863,797
SELF ACTING DISPLAY SYSTEM
Filed May 22, 1930   6 Sheets-Sheet 6

Inventor:
Robert Koller.
By Watson E. Coleman.

Patented June 21, 1932

1,863,797

UNITED STATES PATENT OFFICE

ROBERT KOLLER, OF BADEN, SWITZERLAND

SELF-ACTING DISPLAY SYSTEM

Application filed May 22, 1930, Serial No. 454,805, and in Germany May 28, 1929.

This invention relates to display systems for articles of clothing and the like and particularly to display systems in which the articles such as garments are taken from a magazine or holder, brought into view and returned to the magazine or holder. In my pending application, Serial No. 454,804, I illustrated a display system of this general character in which is provided an endless feed chain, a circular track running in a horizontal plane, an electrically operated carriage carried on this track and carrying the garments one by one into the view space and then conveying them back to the rear end of the carrier chain.

In a construction of this character, inasmuch as the front section of the circular track must be arranged to fall within the view area, as for instance the view area of the show window, and as the carriage with its driving mechanism must also pass through this area, the system required considerable space accommodation.

The object of the present invention, therefore, is to provide an improved display system in which the circular track and the carriage running thereon are dispensed with and in which the operating mechanism is greatly simplified and rendered more compact.

A further object is to provide a construction of this character in which a feed chain and return chain are provided and in which the garment or other article is taken from the feed chain by a horizontally swinging arm, carried to a display position, rotated to fully display the garment, then carried to the return chain or other mechanism of this character and delivered, the arm then swinging back to intial position for the purpose of picking up another garment.

A further object is to provide means whereby the feed, return chains and the oscillating display arm may all be operated automatically from a single motor.

A further object is to provide novel means whereby the garments or other articles supported upon the return chain may be carried from the rear end of the return chain and deposited upon the rear end of the feed chain.

Other objects will appear in the course of the following description.

My invention is illustrated in the accompanying drawings, wherein:—

Figure 2 is a fragmentary top plan view of the forward portion of the apparatus as shown in Figure 1a;

Figure 8 is a section on the line 8—8 of Figure 1a;

Figure 6:
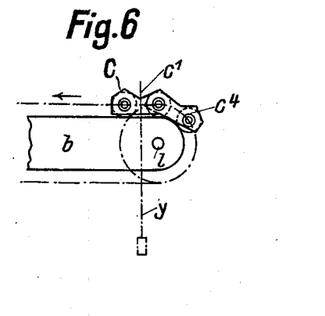
Figure 6 is a fragmentary side elevation of one end of the carrier or return chain and its support.

The general construction of this mechanism embodies an endless carrier chain designated generally $c$, the detail of which is shown in Figure 6 and upon which garment hangers or other carriers are disposed in spaced relation. An arm swinging through a half circle and designated generally F receives a single garment hanger with its garment from the endless chain $c$ at the position P' and carries the garment from the position $P^1$ in Figure 2 to the position designated $P^3$ and at this point a rotation is given to the garment to display the same. The garment is then carried by the swinging arm to the position $P^5$ where it is transferred to a return chain $c^5$ which carries the garment on its hanger rearward to the position $P^6$. A transfer rail $s$ is provided with a transfer lever $u$ (see Figures 1 and 11) which transfers the garment from the position designated $P^6$ in Figure 2 to the position designated $P^8$ and deposits the garment hanger again on the endless chain $c$. This whole mechanism is entirely automatic and is driven from the single motor $m$. The endless chain $c$ which may be of any length, as shown in Figure 6, is guided on a horizontal rail $b$ by means of rollers $c^4$. This rail $b$ also carries the spindles or shafts of the chain wheels $g$. The garments are hung on hangers $y$, the hooks of which engage in the depressions $c$ between the chain members, as shown in dotted lines in Figure 6. The endless chain C is intermittently advanced by means to be described later and at every forward movement, a hanger is released from between the forward links of the chain and dropped to a hook $t^1$ (see Figure 1ª) on the extremity of a lever or swinging arm F which oscillates in a horizontal plane about a vertical shaft W through a range indicated by the dotted lines in Figure 2, that is, from the point $P^1$ to the point $P^5$. This lever F is driven in such a manner that it is for a brief interval held from movement when the lever reaches the middle of its path of travel indicated in full lines in Figure 2. At this time the hook $t^1$ for supporting the hanger $y$ is rotated one or more times to allow the garment to be seen from all sides. The hanger is then delivered by lever F to the endless return chain $c^5$ which is similar in construction to the feed chain $c$ and is arranged parallel to the latter.

The return chain $c^5$, running on the rail $b^1$, is periodically pushed forward in a direction counter to that in which the feed chain $c$ moves and delivers the garments deposited thereon by the arm F to a transverse device $u$ (see Figures 1 and 11), which transverse device will be described more fully later and which moves to and fro along an arcuate rail $s$ between the feed chain $c$ and the return chain $c^5$ and transfers the garments separately to the rear extremities of the feed chain $c$.

Figures 1, 1A:
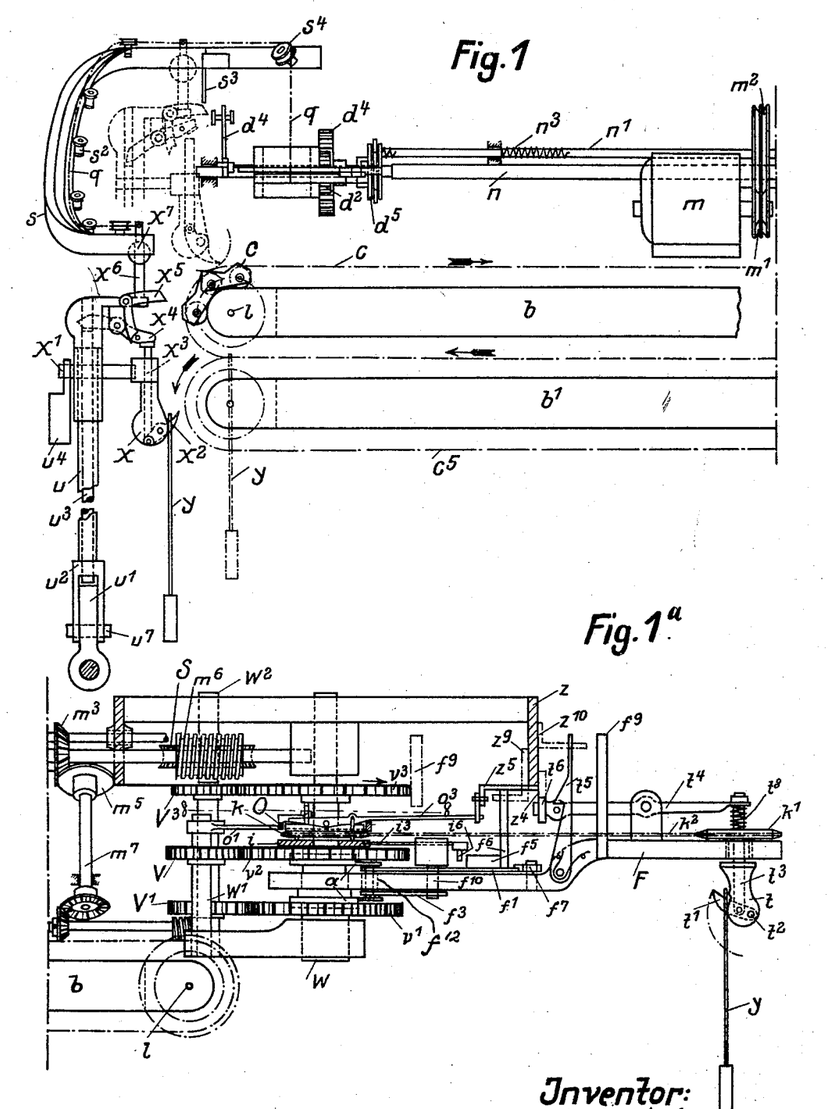
Figure 1 is a fragmentary side elevation of the display system constructed in accordance with my invention, the rail for the transfer lever being shown in section.
Figure 1a is a side elevation of the forward portion of the apparatus, the supporting ring being in section.

The chain $c$, adjustable arm F and the return chain $c^5$ are disposed at three different levels, as shown in Figures 1 and 1ª, the chain $c$ being the highest. As a result of this arrangement, the garments are transferred from feed chain $c$ to arm F by dropping them on the hook $t^1$ and from the latter to the return chain $c$ by simply dropping the hangers off the hook $t^1$ on to the return chain.

Figure 10:
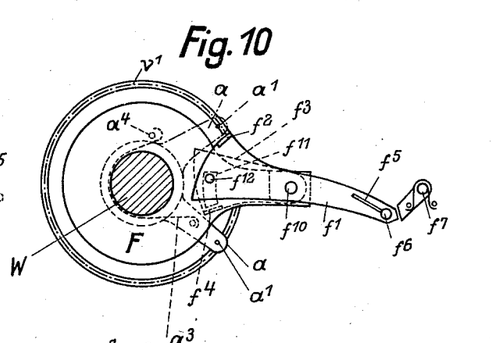
Figure 10 is a fragmentary top plan view of the display arm and allied parts, the shaft being shown in section.

These chains and the display arm F are driven, by a single motor $m$, through a belt or chain passing over wheels $m^1$ and $m^2$. The shaft $n$ on the front end of which is the worm $m^6$ drives a shaft $W^2$ through the worm wheel S. This shaft $W^2$ carries three pinions $V^1$, $V^2$ and $V^3$ (see Figures 1 and 2) mounted one above the other. Pinion $V^3$ meshes with a pinion $v^3$ loose upon a shaft W, which shaft carries the swinging arm F. Pinions $v^1$ and $v^2$ are also loosely mounted for rotation on shaft W being disposed respectively above and below the display arm F. Pinion $v^1$ meshes directly with pinion $V^1$ on the shaft $W^2$ while an intermediate wheel V, as shown in Figures 1ª and 2, is disposed on a shaft $W^1$ between pinion $v^2$ and pinion $V^2$. Hence pinions $v^1$ and $v^2$ rotate in opposite directions. On the faces of the pinions $v^1$ and $v^2$ which confront the display arms F are mounted two like arms $a$, see Figures 1 and 10 the annular hubs of which are mounted on shaft W and preferably disposed in counter-sinks in the respective pinions $v^1$ and $v^2$. Each of these levers $a$ can swing through a small angle and against the action of a spring $a^3$ (see Figure 10) until it engages with a stop $a^4$ mounted on the corresponding pinion. The free extremities of the levers $a$ terminate in pins or abutments $a^1$ and the levers $a$ normally rotate with the relatively opposite rotations of the pinions $v^1$ and $v^2$. On each side of arm F and rotatively mounted on a common pin $f^{10}$ are two levers $f^1$ and $f^3$ which are rigidly connected to each other at their rear extremities by means of a bolt $f^{12}$ passing through a slot $f^{11}$ in lever F. The two levers $f^1$ and $f^3$ carry shoulders $f^2$ and $f^4$, which coacting with the respective arms $a$ as levers $f^1$ and $f^3$ oscillate, are alternately brought within the path of movement of the respective abutments $a^1$ on levers $a$. Thus the arm F is alternately coupled or connected with one or the other of the two counter rotating pinions $v^1$ and $v^2$ and thus has given to it the required oscillating movement to carry the lever F from the point $P^5$ to the point $P^1$ and back again.

Figure 2:
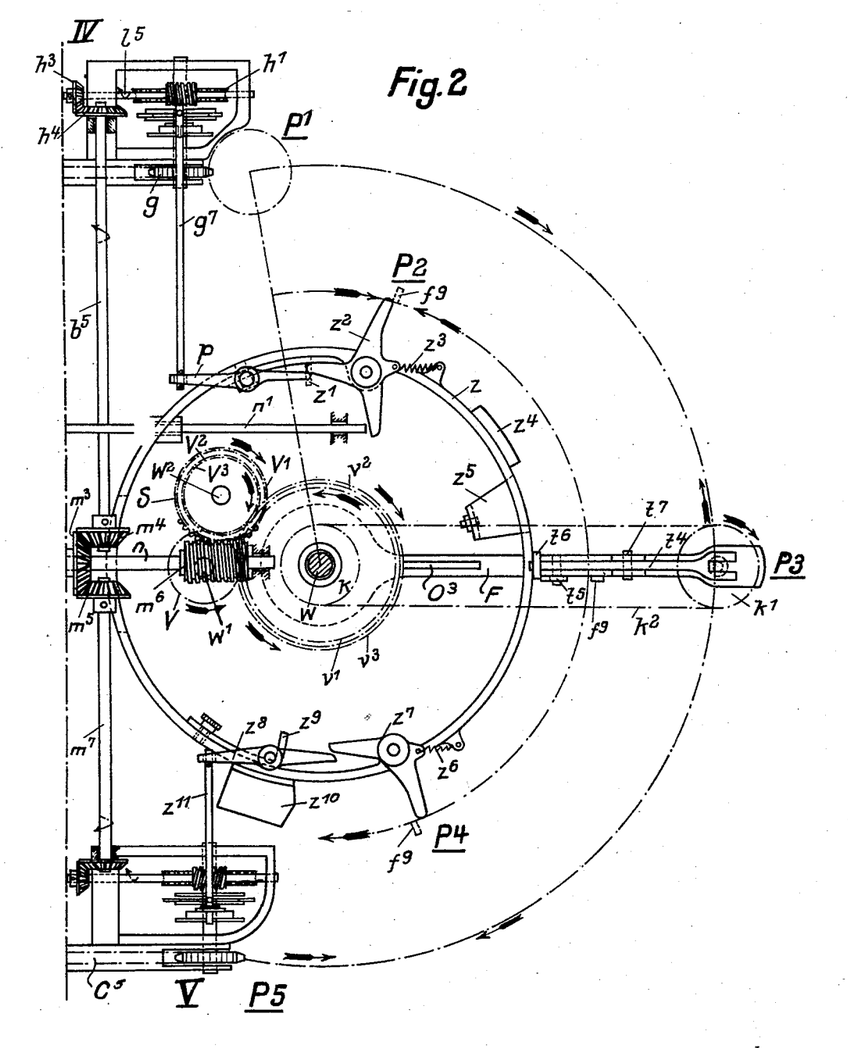

The change in the direction of movement of the lever $f^1$ or the lever $f^3$ is produced by a bolt $f^6$ arranged on the end of lever $f$ (see Figure 10) which, as lever F oscillates, and shortly before the lever F reaches either one of its two end positions, strikes against one or the other of two fixed stops $z^1$ or $z^9$ (see Figure 2). In order to prevent levers $f^1$ and $f^3$ from remaining stationary at their dead points, there is mounted on lever F a spring influenced oscillatable pawl $f^7$ having an angular extremity coacting with the extremity of the lever $f^1$ and urges and holds these levers $f^1$ and $f^3$ out of their dead position. Levers $f^1$ and $f^3$ are deflected alternately in opposite directions approximately at the points $P^1$ and $P^5$ in Figure 1 in the arc described by the extremity of the display arm F.

Because of the fact of the rotative or oscillatory movements of the levers $a$ which carry the abutments $a^1$, arm F remains stationary for a brief instant at the points $P^1$ and $P^5$. During this instant, the article to be displayed is transferred at the point $P^1$ from the chain $c$ and at the point $P^5$ to the chain $c^5$.

For the purpose of supporting a garment hanger on the arm F, the arm F is provided with a hook $t^1$ shown in Figure 1$^a$. This hook is pivoted upon a pin $t^2$ so that the hook has vertical movement. The hook $t^1$ and the pin $t^2$ are mounted in a carrying block $t$ and passing vertically through this carrying block is a pin or link $t^3$ which at its lower end is pivoted to the hook $t^1$ between the pivot $t^2$ and the extremity of the hook. A spring $t^8$ urges the pin $t^3$ upward. This spring keeps the hook $t^1$ upwardly inclined. The vertical pin $t^3$ is rotatably mounted in the extremity of the arm F and carries the sprocket wheel $k^1$, a second sprocket wheel $k$ being rotatably mounted on the shaft W of lever F. An endless chain $k^2$ passes around these wheels $k^1$ and $k^2$.

Figure 8:
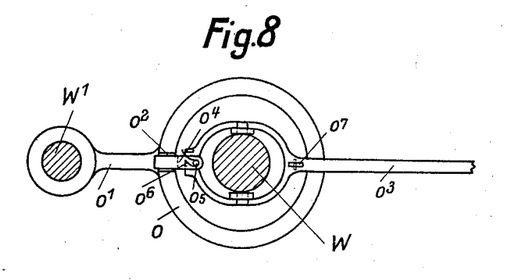

Above the sprocket wheel $k$ (see Figure 5) is arranged a clutch ring O surrounding the shaft W (see Figure 8) which, by means of an arm $O^1$, is engaged with a shaft $W^1$ and is thereby held from rotation. A two-armed clutch operating lever $o^3$ having arms extending in opposite directions is pivotally mounted on a sleeve or ring K rotatably mounted on the shaft W and connected to the sprocket wheel $k$, the lever $o^3$ carries on one of its arms a hook-shaped member $o^4$ which, as this end of the lever $o^3$ swings downward, engages in a notch $o^2$ on the stationary ring $o$. The weight of this hook will normally suffice to cause it to enter the notch $o^2$. Therefore, the sprocket wheel $k$ usually stands still and thus, as lever F swings, chain $k^2$ rotates the sprocket wheel $k^1$ and thus through the chain $k^2$ rotates the pin $t^3$ with hook $t^1$. This rotation is just sufficient to cause the angular position of hook $t^1$ relative to the spectators to remain unaltered for either position of lever F between the position $P^1$ and $P^3$ or between $P^3$ and $P^5$. When lever F, however, is in its middle position with its extremity or end at $P^3$, the hook $t^1$ will turn once or oftener about its pivot $t^3$ so as to display the article to the spectator from all sides.

For the purpose of producing this rotation of the hook $t^1$, sprocket wheel $k$ is temporarily coupled with the uppermost sprocket wheel $v^3$ which is loose on and has constant rotation about the shaft W. This temporary coupling is effected by means of a lock bolt $o^5$ (see Figure 5) carried on the short arm of the rocking lever $o^3$. As the long arm of the lever $o^3$ descends, this bolt $o^5$ enters a cavity $o^8$ in the sprocket wheels $b^3$ while at the same time the hook $o^4$ is pulled out of the notch $o^2$ on the stationary ring O so that the sleeve or ring K and sprocket wheel $k$ rotates with pinion $v^3$. The necessary depression of the lever $o^3$ is secured by a fixed stop $z^5$ (see Figures 1 and 2) which is disposed in the path of movement of and engages the outer end of the long arm of lever $o^3$. Thus at the moment that the arm F arrives at its display position $P^3$, the hook O is released from its engagement with the ring O and the pinion $v^3$ is clutched to the sleeve K and the sprocket wheel $k$. The lock bolt $o^5$ serves also as a pivot for the hook $o^4$ which is influenced by a spring $o^6$ (see Figure 8) so that when the hook $o^4$ is withdrawn from the notch $o^2$, it will be swung clear of the latter whereby after the lever $o^3$ has been released by the fixed stop $z^5$, this hook can no longer enter the notch $o^2$ in the ring O until it is swung back again into its normal position.

Figure 5:
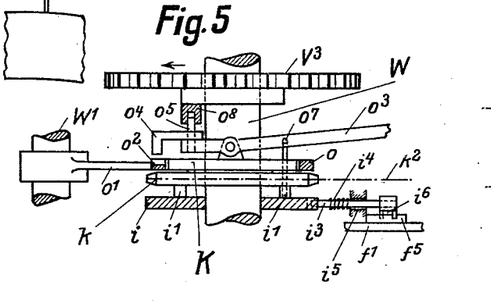
Figure 5 is a fragmentary side elevation partly in section of the means for temporarily raising the garment carrying display lever and means for simultaneously rotating the garment hanger about a vertical axis.
Figure 9:
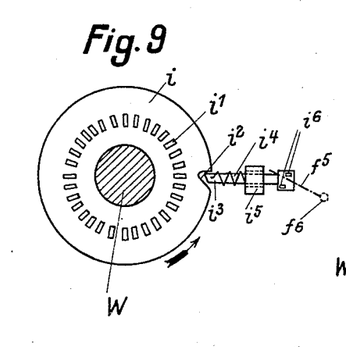
Figure 9 is a top plan view of the detent mechanism for the supporting arm, the shaft being in section.

It is necessary that the display arm F be temporarily held stationary while the hanger with the garment thereon is being rotated and means to this end is shown in Figures 5 and 9.

On the shaft W below the sprocket wheel $k$ there is loosely and rotatably mounted a disk $i$ which carries on its side, facing the sprocket wheel $k$, a series of upwardly projecting teeth $i^1$. A pin $o^7$ connected to the lever $o^3$ engages with the teeth $i^1$ and disk $i$ as the outer end of the lever $o^3$ is depressed by the fixed stop $z^5$ so that this disk $i$ rotates with the sprocket wheel $k$ under these circumstances. The rim of the disk $i$ has a notch $i^2$ into which projects a detent $i^3$ projected by a spring $i^4$. The rod operates within a casing $i^5$. The notch $i^2$ is beveled on one side as is the end face of the detent $i^3$ and thus as the disk $i$ begins to rotate in the direction of the arrow Figure 9, the rod $i^3$ will be pushed outward against the action of the spring. The rod carries upon it the two spurs $i^6$ which, as the rod is pushed outward, come into engagement, (see Figure 10) with a rib $f^5$ on lever $f^1$, this rib extending obliquely to the length of the detent rod so that the connected levers $f^1$ and $f^3$ arrive at their dead points, at which the shoulders $f^2$ and $f^4$ are both reversed out of the range of motion of the abutments $a^1$ on the oppositely rotating sprocket wheels $v^1$ and $v^2$. The display lever F is thus brought to a standstill and this dwell continues until disk $i$ and with it the sprocket wheel $k$ are rotated through approximately 360° when the detent $i^3$ again can spring into the notch $i^2$. At this same instance, the lock bolt $o^5$ is withdrawn from the socket $o^8$ and the hook $o^4$ is inserted in the notch $o^2$ and ring O again holding the wheels $k$ and $k^1$ from rotation. Thereafter the lever F continues its swinging movement until it is again reversed at the position $P^5$ and swings back toward the position $P^1$.

Figure 7:
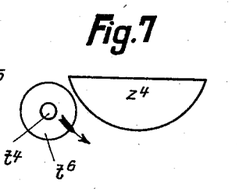
Figure 7 is an end view of the hook operating lever and showing the cam coacting therewith in elevation.
Figure 7A:
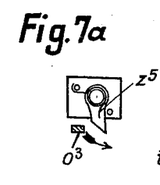
Figure 7a is an end elevation of the pawl which engages the clutch controlling arm, the arm being shown in section.

In the position $P^5$, the small hook $t^1$ is designed to deliver to the return chain $c^5$ the hooked suspender $y$ which it is carrying. To do so the hook $t^1$ must be tilted downward out of the position shown in Figure 1ª. It will be most convenient that this tilting shall be caused simply by the weight of the article suspended on the hook, but in order to do this, the hook must be first released from its fixed position and permitted to drop. To this end, the bolt $t^3$ is held raised by a two arm rocking lever $t^4$ (see Figures 1ª and 2) which engages with the head of the bolt and acts to depress the pivot bolt $t^3$ which in turn raises the hook $t^1$. The free and inwardly directed arm of lever $t^4$ is in general held down by means of a pawl $t^5$, Figure 1ª, so as to keep hook $t^1$ in its raised position. As the display arm F is swung to position $P^5$, this pawl $t^5$ collides with a fixed stop $z^{10}$ carried on a stationary annulus $z$ and is thereby swung far enough to the side as to release lever $t^4$. When this is done, the pin $t^3$ and with it the hook $t^1$ can move downward, under the weight of the costumes supported on the hook against the tension of spring $t^8$ so that the suspender $y$ hung from the hook is set free and drop on the return chain $c^5$. As lever F is returned, a roller $t^6$ which is mounted on the inner arm of lever $t^4$ and comes into engagement with a stationary cam $z^4$ (Figures 1 and 7) so that lever $t^4$ is again restored to its original position in which pawl $t^5$ retains it.

Figure 3:
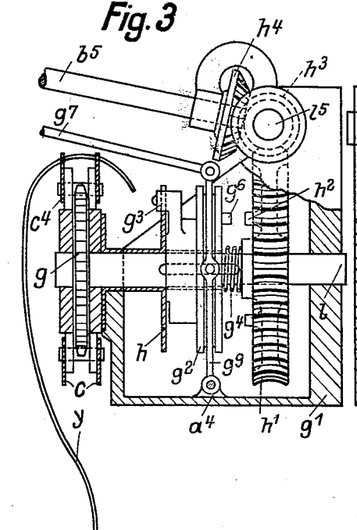
Figure 3 is an end elevation partly in vertical section of the driving mechanism at the forward end of the feed chain.
Figure 4:
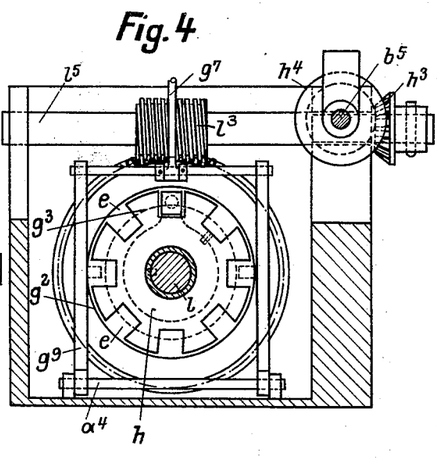
Figure 4 is a section of Figure 3 on the line 4—4 of Figure 3.

Periodic step by step forward movements of the feed chain $c$ and the return chain $c^5$ are effected by driving units IV and V respectively of which only the former IV need be described in detail as the unit V is of similar construction. By reference to Figures 3 and 4, it will be seen that on the shaft $l$ of the front sprocket wheel $g$, a worm wheel $h^1$ is loosely and rotatably mounted. This worm wheel is driven through gears $m^3$, $m^4$, shaft $b^5$, beveled gears $h^4$, $h^3$, shaft $l^5$, and worm $l^3$ from the continuously rotating shaft $n$. On the sprocket shaft $l$ is splined a clutch disk $g^2$ (see Figure 3) which on its side facing the worm wheel $h^1$ carries a row of teeth $g^6$ which as the clutch disk $g^2$ operates, the worm wheel $h^1$, engage with corresponding teeth $h^2$ on the worm wheel so that shaft $l$ and with it the sprocket wheel $g$ is driven forward by worm wheel $h^1$. On its other face, when the clutch $g^2$ is disengaged from the worm wheel $h^1$, it comes into engagement with a stationary disk $h$ which has several slots $e$ distributed uniformly along its periphery as shown in Figure 4. The distance between two consecutive slots $e$ corresponds to the periodic advance movement desired in the feed or return chain $c$. The tooth $g^8$ on the shiftable clutch disk $g^2$ engages in these slots $e$.

The displacement of the clutch disk $g^2$ in one direction or the other is produced by a shiftable yoke $g^9$ engaging with it. This yoke is attached to the rod $g^7$, the other extremity of which is connected to one arm of a two-armed lever $p$ (see Figure 2). The other arm of this lever co-operates with one arm of a three-armed lever $z^2$ which is under the influence of a spring $z^3$. One arm of this 3-armed lever $z^2$ projects within the path of a lug on the lever F so that on engagement by this lug $f^9$, the lever $z^2$ is shifted and consequently the clutch disk $g^2$ is by means of lever $p$, rod $g^7$ and frame $g^9$, brought into engagement with the worm wheel $h^1$. As soon as the lever $z^2$ is released from the lug $f^9$, the clutch disk returns to its original position under the influence of spring $g^4$ disposed between it and the worm wheel $h^1$. The switch unit V is as already stated of like construction to the switch unit IV. Levers $z^2$, $p$ and rod $g^7$ of unit IV have their counter parts in levers $z^7$, $z^8$ and rod $z^{11}$ respectively a unit V while the spring $z^6$ corresponds to $z^3$. The only difference between levers $z^2$ and $z^7$ is that lever $z^2$ for a purpose yet to be explained has a three-arm construction whereas the lever $z^7$ has a two-arm construction. In the driving unit V, the drive of the worm wheel mounted on the sprocket wheel shaft is taken from shaft $m$ through the bevel gears $m^3$, $m^5$ and a shaft $m^7$ in the manner similar to that for unit IV.

Figure 11:
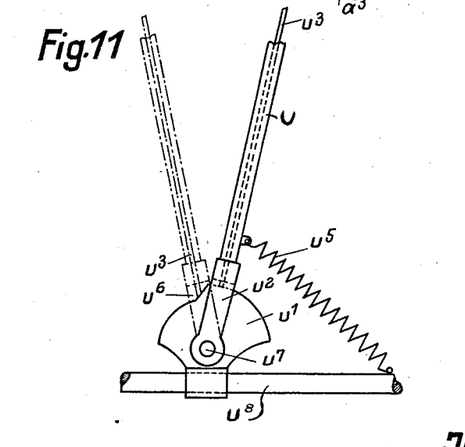
Figure 11 is an elevation of the transfer lever which is disposed between the rear extremity of the feed chain and the return chain.
Figure 12:
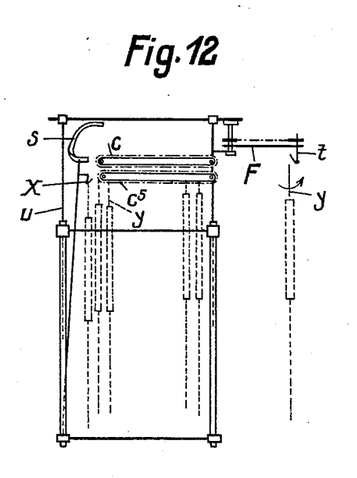
Figures 12, 13 and 14 are diagrammatic elevations on a smaller scale of the entire display system with the carrier frame, Figure 12 being a diagrammatic side elevation, Figure 13 a diagrammatic rear elevation, and Figure 14 a diagrammatic front elevation.
Figure 13:
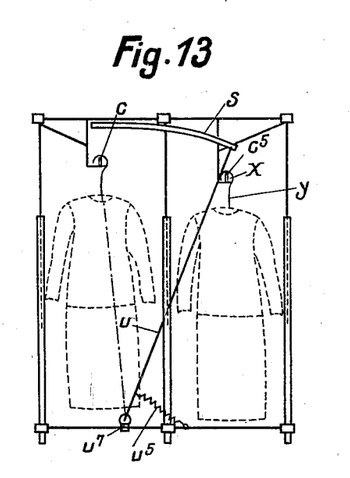
Figure 14:
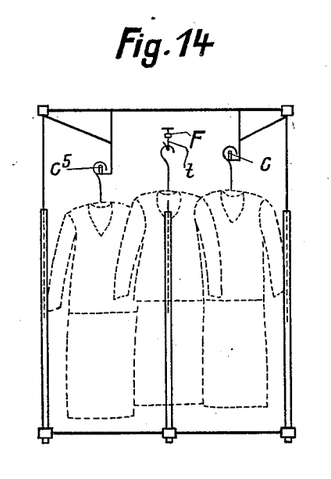

The feed chains $c^5$ and $c$ are arranged on different levels and associated with the rear ends of the feed and return chain flights is arranged an arcuate rail $s$ which is transversely inclined to correspond to these different levels. Under this arcuate rail $s$ is mounted the lever $u$ (see Figure 11) pivoted on a pivot $u^7$ which passes through a segment $u^1$ in turn rockingly mounted upon the shaft $u^8$. In the upper, preferably rectangularly bent extremity of this lever $u$ is disposed a vertical pin $x^6$ (see Figure 1). On its free extremity, the pin carries a ball $x^7$ which engages in a suitable guideway on the under side of the rail $s$ so that the upper extremity of the lever $u$ when this lever is oscillated, as shown in Figure 11, travels around the rail $s$. The pin $x^6$ has a prolongation which travels in a slot $s'$ formed in the rail $s$, the slot being shown in Figure 2ª. To this pin $x^6$ and specifically to the upper prolongation thereof is attached a cord $q$ or other flexible connection (see Figure 2) which is connected to the upper end of the lever $u$ and serves to oscillate this lever by mechanism which will later be described more fully. A horizontal pivot pin $x^1$ passes through the upper end of the lever $u$ and carries on its inner extremity a supporting member $x$ in which is mounted a vertical rod $x^3$, this rod being vertically movable. The rod $x^3$ at its lower extremity engages with the rear end of a pivoted tiltable carrying hook $x^2$. The upper extremity of the rod $x^3$ coacts with one arm of a double arm locking lever $x^4$, the rear arm or end of which engages with and is supported by the upper end of a rod $u^3$ which is shiftable lengthwise within the hollow or tubular lever $u$.

This rod $u^3$ at its lower end is engaged by the curved or cam-shaped edge face $u^6$ of the segment $u^1$. The cam or segment $u^1$ has its edge face of such form that the carrier hook $x^2$, when it reaches a position adjacent the rear end of the return chain $c^5$ takes the carrying position shown in Figure 1 but as the carrier hook $x^2$ arrives above the rear end of the feed chain $c$, the hook is set free to tilt over or downward, this second position being indicated by the dotted lines in Figure 1. Bearing on the lever $x^4$ which co-operates with the rod $x^3$ is a pawl $x^5$ in the form of an angular lever. This pawl as hook $x^2$ arrives above the rear of the feed chain $c$ is rendered inoperative by a fixed stop $s^3$ (Figure 1). In order to make it certain that the carrier body $x$ with hook $x^2$ shall at all times maintain a vertical position as the lever $u$ oscillates, a weight $u^4$ is attached to the outer end of the pivot pin $x^1$, as shown in Figure 1, thus maintaining the hook supporting body $x$ in its vertical position at all times.

Figure 2A:
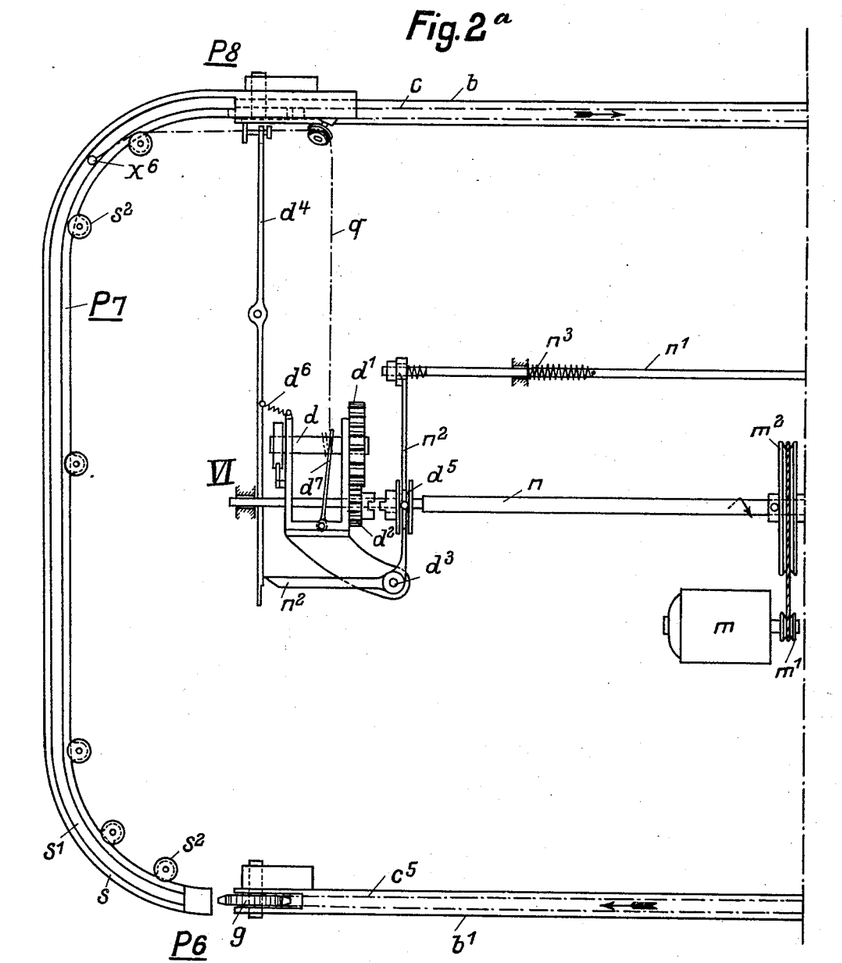
Figure 2a is a fragmentary top plan view of the rear portion of the apparatus and is to be read in connection with Figure 2.

The oscillation of the lever $u$ is produced by the cord $q$ which is fastened to the vertical pin $x^6$ on the lever and which alternately winds up and unwinds from a drum $d$ (see Figure 2a). This drum is alternately rotated in opposite directions. In one of these directions, the drum takes its power from the continuously revolving shaft $n$ and when the drum is operatively released from this shaft $n$, it is rotated in the opposite direction by a traction spring $u^5$ or by a weight acting on the lever $u$. The drum $d$ is provided on one extremity with a gear wheel $d^1$ which meshes with a pinion $d^2$. This pinion $d^2$ is connected with the stationary part of a clutch, the movable element $d^5$ of which is mounted on the shaft $n$. The temporary engagement of pinion $d^2$ to the shaft $n$ is secured by the swinging motion of the lever F which, as it swings from point $P^1$ to $P^2$, engages the lever $z^2$ (see Figure 2), the third arm of which rests upon the longitudinally shiftable rod $n^1$. As lever $z^2$ rotates or moves in a clockwise direction, the rod $n^1$ is displaced toward the left in Figures 2 and 2a against the influence of a spring $n^3$ and in doing so carries with it a lever $n^2$ pivoted about the pivot $d^3$. The lever $n^2$ is a bell crank lever and one of its arms carries the slidable clutch element $d^5$ and, therefore, brings it, during this last named movement, into engagement with the clutch element arranged on pinion $d^2$, whereupon the rotary motion of shaft $n$ is transmitted to the winding drum $d$ over the gears $d^1$ and $d^2$. As soon as lever $z^2$ is allowed to clear the stop $f^3$ on lever $f$, rod $n^1$ tends, under the influence of the spring $n^3$ to return to its original position and thus throw the clutch $d^5$ out of coactive engagement with the drum. In order to maintain the clutch between the shaft $n$ and pinion $d^2$ in position for the time required, a double armed lever $d^4$ is provided which, under the action of a spring $d^6$ engages over the longitudinally extending arm of the angular lever $n^2$ when the clutch is thrown in and holds this lever against reverse movement. Thereafter cord $q$ is wound on to the drum $d$, causing the lever $u$ to move from point $P^6$ over point $P^7$ toward point $P^8$. When the lever $u$ arrives at points $P^8$, pawl $x^5$, which at this instant comes clear, engages against the backwardly extending arm of pawl lever $d^4$, causing the latter to release the clutch lever $n^3$ so that rod $n'$ can, under the influence of spring $n^3$ return to its original position. The clutch connection of shaft $n$ with pinion $d^2$ and the drum is thus broken off and the drum thus comes to a stop.

The lever $u$ is then again swung back by the spring $u^5$ to the point $P^6$ and the same sequence of movements is repeated. To secure the uniform winding up of cord $q$ on drum $d$, a fork $d^7$ is provided which is moved by means (not shown) to and fro and disposes the windings uniformly on the drum.

The specific operation of the parts has been described heretofore. The general operation is as follows:—

All of the moving parts are driven from the motor $m$. The arm $f$ is oscillated back and forth from $P^1$ to $P^5$. As the arm nears the point $P^1$, the feed chain C will be operated one step to discharge a hanger upon the hook $t^1$. At this time the lever $u$ is being operated to shift a hanger carried by the hook $x^2$ over to the feed chain and as this hook $x^2$ reaches the point above the feed chain, the hook is opened as shown in dotted lines in Figure 1 and the hanger deposited upon the feed chain. As the arm F moves back again carrying a hanger with it, connection of the drum to the shaft is released and the drum moves in the reverse direction allowing the lever $u$ to be carried back to its initial position ready to receive another hanger for the return chain $c^5$. Meanwhile, the arm F is rotating toward the position P³ and in this position, its movement is halted and the hook body $t$ rotated one or more times by means of the mechanism shown in Figure 5, thus displaying the garment from all sides to the spectator. As soon as this display rotation has been ended, the arm F continues its movement toward the position P⁵ and as it reaches the lever $z^6$, it operates the lever, causing the operative connection of the driving sprocket wheel of the return chain with the motor and a movement of the return chain sufficient to deposit the garment hanger upon the hook $x^2$. The lever F then swings back to its initial position to receive another garment and the operation is repeated ad infinitum.

What I claim as my invention and desire to secure by Letters Patent of the United States is:

1. An automatic display system including an endless article supporting chain disposed in a vertical plane, means for shifting said chain step by step in one direction, an endless return chain moving step by step in the opposite direction and extending approximately parallel to the first named chain, means for receiving the article from the forward end of the first named chain and moving it across the space between the two chains and transferring the article on to the second named chain, and means for transferring the article from the second named chain to the rear end of the first named chain.

2. An automatic display system of the character described, including a horizontally swinging article supporting arm, means for swinging said arm in a horizontal plane alternately in opposite directions, motor operated means for transferring articles one by one into engagement with the end of said arm when the latter is in one position, and means for receiving the article carried by said arm at the other end of its swinging movement.

3. An automatic display system of the character described, including a horizontally swinging article supporting arm, means for swinging said arm in a horizontal plane alternately in opposite directions, motor operated means for transferring articles one by one into engagement with the end of said arm when the latter is in one position, means for receiving the article carried by said arm at the other end of its swinging movement, and means for causing the rotation of the article when the arm is in a position between the two extremities of its movement.

4. An automatic display system including an endless feed chain disposed in a vertical position, an endless return chain spaced from the first named chain, said chains being formed to support article hangers in spaced relation to each other, motor operated means for moving said chains in reverse directions, a swinging arm pivotally mounted between the two chains, motor operated means for swinging said arm in a horizontal plane to carry the end of the arm alternately into a receiving position at the forward end of the feed chain and into a discharging position at the forward end of the return chain, motor operated means on the arm acting to hold the hanger in a position approximately at right angles to the arm except at one point, said motor operated means acting to rotate the hanger on a vertical axis when the arm has reached one point in its travel, means automatically disengaging the hanger from the arm and depositing the hanger on the return chain when the arm has reached its discharge position, and motor operated means receiving hangers successively from the rear end of the return chain and transferring the hangers successively to the rear end of the feed chain.

5. An automatic display system including an endless feed chain disposed in a vertical position, an endless return chain spaced from the first named chain, said chains being formed to support article hangers in spaced relation to each other, motor operated means for moving said chains in reverse directions, a swinging arm pivotally mounted between the two chains, motor operated means for swinging said arm in a horizontal plane to carry the end of the arm alternately into a receiving position at the forward end of the feed chain and into a discharging position at the forward end of the return chain, motor operated means on the arm acting to hold the hanger in a position approximately at right angles to the arm except at one point, said motor operated means acting to rotate the hanger on a vertical axis when the arm has reached one point in its travel, means automatically disengaging the hanger from the arm and depositing the hanger on the return chain when the arm has reached its discharge position, and motor operated means receiving hangers successively from the rear end of the return chain and transferring the hangers successively to the rear end of the feed chain, said means including a track, a hanger support traveling on the track and having a hook, an oscillatable lever connected to the article support and shiftable along the track, motor operated means controlled by the oscillation of the arm for causing an oscillation of said lever in opposite directions from a receiving position at the rear of the return chain to a position discharging on to the rear end of the feed chain, and means automatically releasing the hook on the hanger support when the lever has reached a position over the rear end of the feed chain to permit the hanger to drop on to the feed chain.

6. A display system of the character described, including an endless vertically disposed feed chain, an endless vertically disposed return chain disposed on a level below the feed chain, the feed chain and return chain being laterally spaced from each other and being formed to sustain garment hangers in successive spaced relation to each other, a display arm pivotally mounted for movement in a horizontal plane between the forward end of the feed chain and the forward end of the return chain, and having a releasable hook adapted to receive a hanger dropped upon it from the feed chain and when released adapted to drop the hanger on to the return chain, means for carrying articles from the rear end of the return chain to the rear end of the feed chain, and motor operated means for driving said feed chains in reverse directions, oscillating said arm, and actuating the transfer means.

7. A display system of the character described, including a display arm oscillatable about a vertical axis, a hook supporting body on the end of the arm, a hook pivoted in said body, a rod extending vertically through the body and longitudinally above the arm, a lever pivoted on the arm with its outer end holding the rod and hook raised, a pawl engaging said lever and preventing depression of the outer end, a cam at one end of the path of movement of the arm acting to release the pawl and permit the hook to swing downward under the weight of and discharging the article therefrom, means adjacent the other end of the path of movement and engaging the inner end of the lever to depress it to thereby swing the hook upward, motor operated means for swinging said display arm, motor operated means carrying article hangers one by one toward and depositing them successively on to the hook when it is raised, and motor operated means receiving said articles successively from the display arm when the hook is depressed and carrying them away from the display arm.

8. An automatic display system of the character described, including an endless vertically disposed feed chain, a parallel endless vertically disposed return chain, both of said chains being formed to carry article hangers in successive spaced relation thereon, the feed chain being on a higher level than the return chain, a display arm swinging on a vertical axis between the forward ends of the chains, and being disposed between the levels of the chains and carrying a releasable hanger supporting means, motor-operated means for swinging the arm alternately to a position to receive the hanger from the feed chain and to a position to discharge the hanger on to a return chain, means causing the release of the hook as it reaches a position above the return chain to thereby drop a hanger on to the return chain, means causing the hook to move into receiving position as it nears the feed chain, constantly operating motor driven driving means for the feed and return chains, sprocket wheels for the chains, and means actuated automatically as the display arm nears receiving position acting momentarily to connect the driving means with a feed chain sprocket wheel and cause the feed chain to advance one step and then disconnect the driving means therefrom, and means acting automatically upon a movement of the arm away from the return chain to momentarily connect a return chain sprocket wheel with its driving means.

9. In a display system as in claim 8, means for carrying the hangers one by one from the rear end of the return chain to the rear end of the feed chain including a transfer track extending transversely of the chains and having curved end portions extending in the general directions of the chains, the track being inclined upward from the return chain to the feed chain, a lever pivoted at its lower end for lateral and longitudinal movement and carrying a releasable pivoted hook, the upper end of the lever operatively engaging said track and being guided thereby, the pivot of the lever being nearer the feed chain than the return chain whereby the upper end of the lever will be disposed beneath the return chain when the lever is swung in this direction and above the feed chain when the lever is swung to its discharge position, and motor operated means oscillating said lever to carry it from the return chain to the feed chain, means for releasing the hook when the hook is disposed above the feed chain to thereby deposit a hanger upon the feed chain, and means for returning the lever to the return chain and automatically lifting the hook upon a return movement of this transfer lever.

10. In a structure as in claim 8, means for carrying the hangers one by one from the rear end of the return chain to the rear end of the feeding chain including a feed chain and a return chain disposed in parallel relation to each other, both of said chains being formed to carry article hangers in successive spaced relation, the feed chain being on a higher level than the return chain, motor operated means for carrying articles one by one from the forward end of the feed chain to the forward end of the return chain, and means for carrying articles one by one from the rear end of the return chain to the rear end of the feed chain, comprising a transfer lever pivoted at its lower end and laterally oscillatable to carry its upper end into a position beneath the rear end of the return chain and in the other direction to a position above the rear end of the feed chain, means carried by the upper end of the lever for receiving an article discharged from the rear end of the return chain and automatically discharging said article on to the rear end of the feed chain, a track disposed between the rear end of the return chain and the rear end of the feed chain, the transfer lever at its upper end having operative engagement with the track, and means for oscillating the lever including a winding drum, a cable on the drum trained to that end of the track adjacent the feed chain and trained along the track to the return chain, a motor operated shaft, a sliding clutch element thereon, driving gears on the drum and having a clutch element, means normally retracting the sliding clutch element from the drum clutch element, means actuated by the movement of the display arm away from the feed chain automatically shifting the clutch element into engagement with the clutch element on the drum to thereby cause the winding up of the cable, means urging the clutch element into engagement with the drum clutch element, means acting to automatically release the clutch elements when the transfer lever has moved into coactive relation to the feed chain, and means causing the return of the transfer lever into coactive relation to the return chain when the clutch is released.

11. A display system including a display arm swingable horizontally between a receiving point and a discharge point, a hook mounted on the display arm and adapted to support an article hanger, and means for oscillating the arm comprising two constantly rotating pinions disposed concentric to the axis of and disposed respectively above and below the arm, motor operated means continuously rotating said pinions in opposite directions, and means for alternately coupling the arm to one or the other of said pinions.

12. A display system as in claim 11 in which the means for alternately coupling the display arm to the oppositely rotating pinions includes two rocking levers pivoted on the opposite face of the arm and rigidly connected to each other, means disposed in the path of movement of the rocking levers for shifting them alternately in opposite directions, and means controlled by this shifting of the rocking levers for alternately connecting the display arm operatively with one or the other of said pinions.

13. A display system as in claim 11 in which the means for alternately coupling the display lever with the oppositely rotating pinions includes two rocking levers pivoted on opposite faces of the display arm and rigidly connected to each other, the rocking levers being formed each with a shoulder, the shoulders projecting in opposite directions, means disposed in the path of movement of the rocking levers for shifting them alternately in opposite directions, the two pinions having each spring supported abutments with which the shoulders on the rocking levers alternately engage as the rocking levers are shifted.

14. A display system as in claim 11 in which the means for alternately coupling the display lever with the oppositely rotating pinions includes two rocking levers pivoted on opposite faces of the display arm and rigidly connected to each other, the rocking levers being formed each with a shoulder, the shoulders projecting in opposite directions, means disposed in the path of movement of the rocking levers for shifting them alternately in opposite directions, the two pinions having each spring supported abutments with which the shoulders on the rocking levers alternately engage as the rocking levers are shifted, the forward extremities of the rocking levers being beveled, and a spring actuated member mounted upon the arm with which the beveled faces of the rocking levers engage acting to shift said levers from their neutral position.

15. A display system including a display arm swingable horizontally between a receiving point and a discharge point, a hook supporting body rotatably mounted upon said arm and adapted to support an article hanger, a sprocket wheel mounted on the body, a second sprocket wheel mounted on the rotative axis of the arm, and means for holding the last named sprocket wheel immovable as the arm swings, a sprocket chain trained over said sprocket wheels whereby as the lever oscillates the chain will be shifted relative to the fixed sprocket wheel to thereby rotate the sprocket wheel on the hook body and cause the article supported on the hook to be always presented in the same direction as the arm oscillates.

16. A display system of the character described, including a display arm swingable horizontally between a swinging point and a discharge point, a hook rotatably mounted upon said arm and adapted to support an article hanger, a shaft upon which the arm is supported, a sprocket wheel engaging the hook and rotatable therewith, a second sprocket wheel disposed concentric to said shaft, a sprocket chain trained over the two sprocket wheels, a driving pinion for the sprocket wheel on the shaft, means for locking the sprocket wheel on the shaft from rotation during a portion of the oscillation of the display arm, means then acting to connect the sprocket wheel on the shaft with its driving pinion whereby to cause the rotation of the sprocket wheels and the hook, and means then disconnecting the sprocket wheel on the shaft from the driving pinion and locking the sprocket wheel on the shaft from movement during the remainder of the movement of the arm.

17. A structure as in claim 16 in which the means for locking the sprocket wheel on the shaft from rotation or connecting it to the driving pinion includes a clutch lever disposed between said driving pinion and the sprocket wheel on the shaft, locking means and clutching means carried by said lever, and locking means in one position of the lever locking the sprocket wheel from rotation and in the other position of the lever engaging the sprocket wheel with the driving pinion, and means disposed in the path of movement of the display lever automatically engageable with the clutch lever to shift it into position to engage the driving pinion with the sprocket wheel to thus cause a rotation of the article supporting hook, means holding the lever from oscillation at this time, means acting after a predetermined number of revolutions of the sprocket wheels to release said display lever to permit it to continue its oscillation, and means simultaneously acting to release the engagement between the pinion and sprocket wheel, and lock the sprocket wheel on the shaft from rotation.

ROBERT KOLLER.